US012675726B2

(12) United States Patent (10) Patent No.: US 12,675,726 B2

Griffin et al. (45) Date of Patent: Jul. 7, 2026

(54) QUANTUM SERVICE DISCOVERY

(71) Applicant: Red Hat, Inc., Raleigh, NC (US)

(72) Inventors: Leigh Griffin, Waterford (IE); Stephen Coady, Dublin (IE)

(73) Assignee: Red Hat, Inc., Raleigh, NC (US)

( * ) Notice: Subject to any disclaimer, the term of this patent is extended or adjusted under 35 U.S.C. 154(b) by 411 days.

(21) Appl. No.: 18/102,008

(22) Filed: Jan. 26, 2023

(65) Prior Publication Data

US 2024/0256940 A1 Aug. 1, 2024

(51) Int. Cl.
| | |
|---|---|
| *H04L 9/40* | (2022.01) |
| *G06N 10/40* | (2022.01) |
| *G06N 10/80* | (2022.01) |

(52) U.S. Cl.
CPC ............. *G06N 10/80* (2022.01); *G06N 10/40* (2022.01); *H04L 63/10* (2013.01)

(58) Field of Classification Search
CPC  H04L 63/10–108; G06N 10/80; G06N 10/40; G06N 10/00
See application file for complete search history.

(56) References Cited

U.S. PATENT DOCUMENTS

| | | | |
|---|---|---|---|
| 10,614,370 B2 | 4/2020 | Johnson et al. | |
| 11,366,787 B2 | 6/2022 | Griffin et al. | |
| 11,416,221 B2 | 8/2022 | Griffin et al. | |
| 2004/0244013 A1* | 12/2004 | Yumoto | G06F 13/4013 |
| | | | 719/321 |
| 2019/0149327 A1 | 5/2019 | Yuan et al. | |
| 2020/0201655 A1* | 6/2020 | Griffin | G06F 9/4494 |
| 2021/0334237 A1* | 10/2021 | Coady | G06F 16/18 |
| 2021/0374583 A1* | 12/2021 | Griffin | G06N 10/80 |
| 2022/0164692 A1* | 5/2022 | Inoue | G06N 10/00 |
| 2022/0188686 A1 | 6/2022 | Richardson et al. | |
| 2024/0070514 A1* | 2/2024 | Samuel | G06N 10/80 |
| 2024/0378476 A1* | 11/2024 | Wang | G06N 10/20 |

FOREIGN PATENT DOCUMENTS

| | | | | |
|---|---|---|---|---|
| CN | 112398642 A | * | 2/2021 | ........... H04L 41/082 |
| CN | 113852500 A | * | 12/2021 | ............. H04B 10/70 |

OTHER PUBLICATIONS

Indika Kumara et al., "QSOC: Quantum Service-Oriented Computing", Jheronimus Academy of Data Science, Netherlands, May 4, 2021.
Aqsa Fatima, "Securing the Cloud Using Quantum Networking Protocols", University of Texas at San Antonio, Aug. 2016.

* cited by examiner

*Primary Examiner* — Trong H Nguyen
(74) *Attorney, Agent, or Firm* — Womble Bond Dickinson (US) LLP

(57) ABSTRACT

Embodiments of the present disclosure provide techniques for implementing a service provider to collect quantum service metadata about multiple quantum systems on multiple quantum machines and storing this quantum service metadata in a service registry. The service provider may transmit a request for access with a qubit registry to each of a plurality of quantum machines, where the plurality of qubit registries store quantum service metadata associated with a plurality of quantum services configured on the plurality of quantum machines. The service provider may receive acceptance for access to each of the plurality of qubit registries. In addition, the service provider may periodically request the quantum service metadata from the plurality of qubit registries and store the received quantum service metadata in a service provider registry.

20 Claims, 6 Drawing Sheets

100

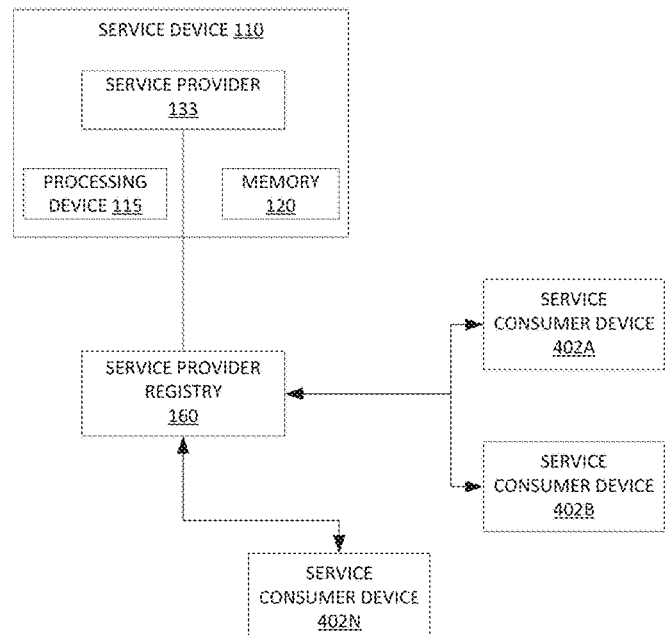
*FIG. 4*

500

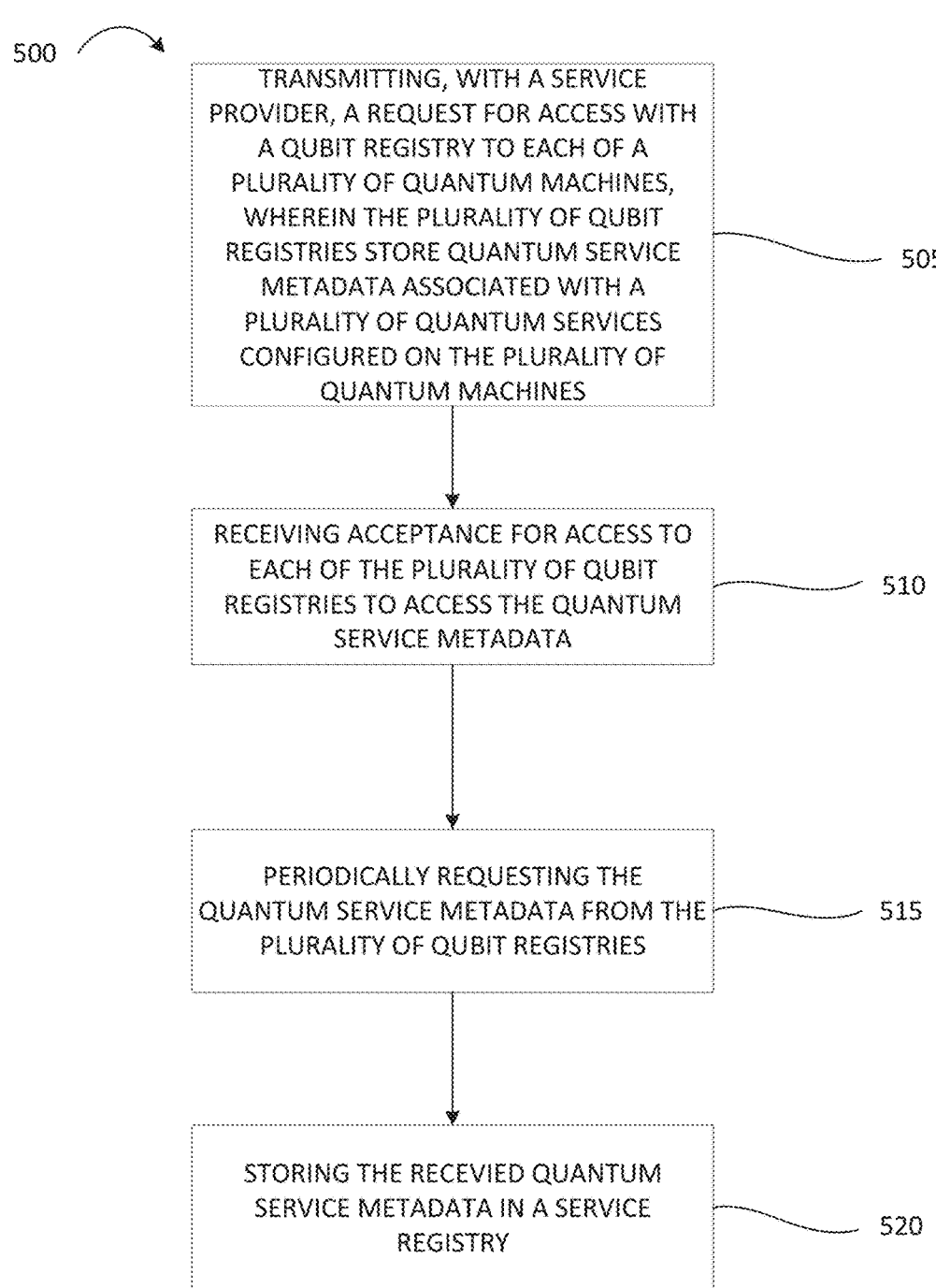

TRANSMITTING, WITH A SERVICE PROVIDER, A REQUEST FOR ACCESS WITH A QUBIT REGISTRY TO EACH OF A PLURALITY OF QUANTUM MACHINES, WHEREIN THE PLURALITY OF QUBIT REGISTRIES STORE QUANTUM SERVICE METADATA ASSOCIATED WITH A PLURALITY OF QUANTUM SERVICES CONFIGURED ON THE PLURALITY OF QUANTUM MACHINES — 505

RECEIVING ACCEPTANCE FOR ACCESS TO EACH OF THE PLURALITY OF QUBIT REGISTRIES TO ACCESS THE QUANTUM SERVICE METADATA — 510

PERIODICALLY REQUESTING THE QUANTUM SERVICE METADATA FROM THE PLURALITY OF QUBIT REGISTRIES — 515

STORING THE RECEVIED QUANTUM SERVICE METADATA IN A SERVICE REGISTRY — 520

*FIG. 5*

QUANTUM SERVICE DISCOVERY

TECHNICAL FIELD

Aspects of the present disclosure relate to a service provider that collect quantum service metadata from multiple quantum services on multiple quantum machines and stores this quantum service metadata in a service registry.

BACKGROUND

Network management systems (NMS) are devices that can monitor a collection of traditional devices, such as servers, personal computers, gateways, routers, and other traditional types of devices. The NMS can query each of the managed devices for state information and store this state information in a management store. Unfortunately, traditional NMS are not setup for the handling of quantum services over possibly multiple quantum machines.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 4 is a block diagram that illustrates an example system, in accordance with some embodiments of the present disclosure.

FIG. 5 is a flow diagram of a method of implementing a qubit registry that is enhanced to gate the allocation of qubits using a contract, in accordance with some embodiments of the present disclosure.

DETAILED DESCRIPTION

Figure 1:
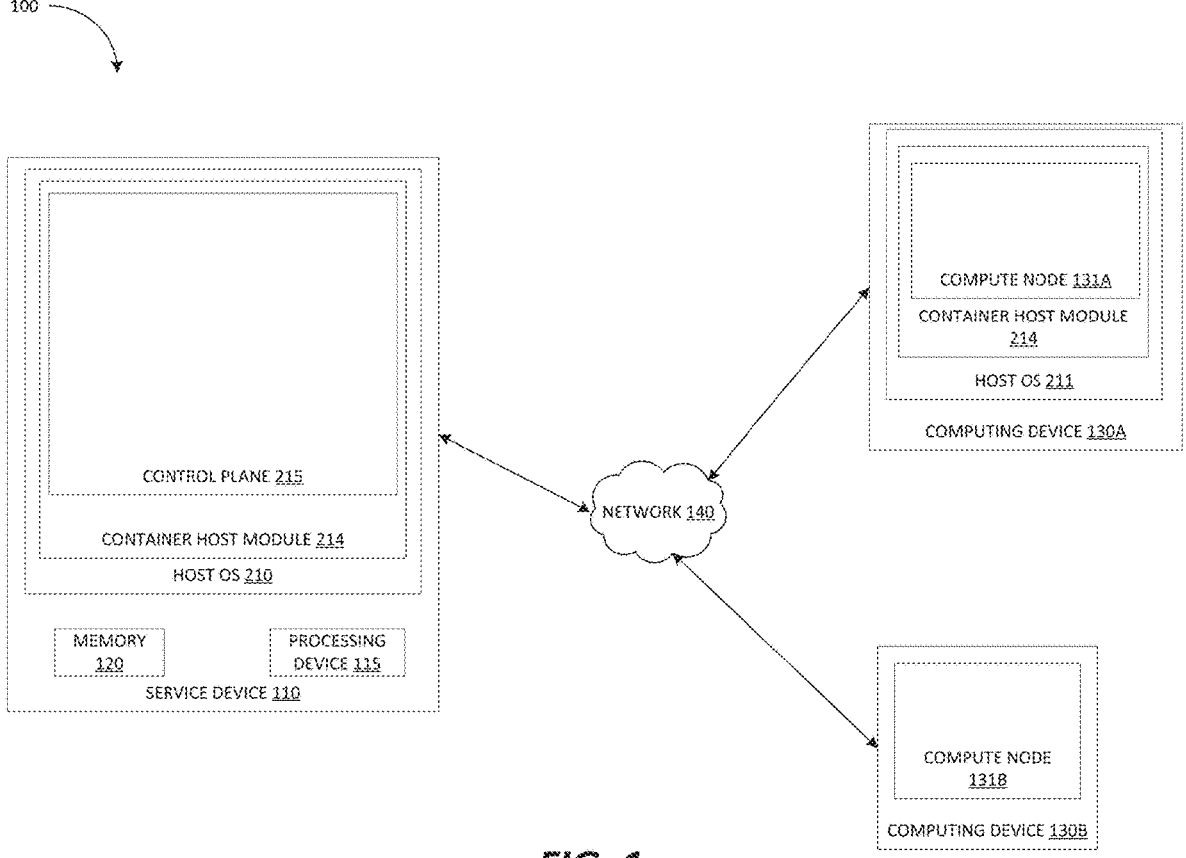
FIG. 1 is a block diagram that illustrates an example system, in accordance with some embodiments of the present disclosure.

Network management systems (NMS) are devices that can monitor a collection of traditional devices, such as servers, personal computers, gateways, routers, and other traditional types of devices. The NMS can query each of the managed devices for state information and store this state information in a management store.

Quantum computing is a type of computation that harnesses the collective properties of quantum states, such as superposition, interference, and entanglement, to perform calculations. The devices that perform quantum computations are known as quantum computers. Although there are different types of quantum computers, one of the most widely used is the quantum circuit, based on the quantum bit (also referred to as a "qubit"). A qubit can be in a 1 or 0 quantum state, or in a superposition of the 1 and 0 states.

When it is measured, however, it is always 0 or 1 and the probability of either outcome depends on the qubit's quantum state immediately prior to measurement. Using non-quantum hardware, a search problem with a search space of N items requires examination of the search space on the order of N times to find the item being sought. However, quantum hardware may solve the search problem after examining the search space approximately $\sqrt{N}$ times. Although classical cluster management services can discover classical machines/computing devices and create clusters using classical hardware, they are unable to support creation of clusters that use quantum hardware.

In the current NISQ era, qubits are fragile resources and in a shared environment where multiple services must share the same finite pool of qubits, effective management and gating of qubit allocation is important to maintain a system that can run quantum services efficiently. For example, services that are misconfigured may cause noise and errors that put stress on a quantum machine. Further, if a service is misconfigured or does not execute properly, it may not release the qubits it has been allocated upon completion, thereby denying access to those qubits for other services. Certain services can also misuse qubits, e.g., by requesting all available qubits of a quantum system and starving other services of the qubits they need to execute. In addition, it is important to ensure that the right services get access to qubits. Currently, there are no real barriers to reserving qubits outside of availability. Thus, in a quantum machine with 100 qubits, a single service can reserve all 100 qubits via a qubit registry.

The present disclosure addresses the above-noted and other deficiencies by providing a service provider service that collects quantum service metadata about multiple quantum systems on multiple quantum machines and stores this quantum service metadata in a service registry. This quantum service metadata is data that characterizes the state and use of the multiple quantum systems. For example, the quantum service metadata can include data that is how the quantum service can be connected, a protocol a quantum service uses to connect, authentication mechanism, qubits the quantum service has access to, whether the quantum service has programmatic markers for entanglement, capacity, noise, error count, geolocation for qubits, qubit temperature, and quantum channel routing.

In a cluster of quantum machines, one or more quantum services can be defined, where each of the quantum service can use qubits from on quantum machine or multiple quantum machines. Each quantum machine includes a registry that stores The service provider device transmits requests for access to each of the registries on the multiple quantum machines. Each registry can grant access using a rules-based database. With access granted, the service provider device can collect the quantum service metadata from the different registries and stores this collected quantum service metadata in a service registry. In one embodiment, the service provider processes the collected quantum service metadata to help gain an understanding of the current state of quantum service from a load, performance, noise, error etc. point of view. In this embodiment, the service provider can organize the quantum service metadata in a lookup manner collated against a quantum service FIG. 1 is a block diagram that illustrates an example system 100. As illustrated in FIG. 1, the system 100 includes a service device 110, and a plurality of computing devices 130. The service device 110 and computing devices 130 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. In some embodiments, the network 140 may be an L3 network. The network 140 may carry communications (e.g., data, message, packets, frames, etc.) between service device 110 and computing devices 130. Each service device 110 and computing device 130 may include hardware such as processing device 115 (e.g., processors, central processing units (CPUs), memory 120 (e.g., random access memory 120 (e.g., RAM), storage devices (e.g., hard-disk drive (HDD), solid-state drive (SSD), etc.), and other hardware devices (e.g., sound card, video card, etc.). In some embodiments, memory 120 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 120 may be configured for long-term storage of data and may retain data between power on/off cycles of the service device 110.

FIG. 1 and the other figures may use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

In some embodiments, each of the service device 110 and computing devices 130 may comprise any suitable type of computing device or machine that has a programmable processor including, for example, server computers, desktop computers, laptop computers, tablet computers, smartphones, set-top boxes, etc. In some examples, each of the service device 110 and computing devices 130 may comprise a single machine or may include multiple interconnected machines (e.g., multiple servers configured in a cluster). The service device 110 and computing devices 130 may be implemented by a common entity/organization or may be implemented by different entities/organizations. For example, service device 110 may be operated by a first company/corporation and one or more computing devices 130 may be operated by a second company/corporation. Each of service device 110 and computing devices 130 may execute or include an operating system (OS) such as host OS 210 and host OS 211 of computing device 110 and 130A respectively, as discussed in more detail below. The host OS of a computing device may manage the execution of other components (e.g., software, applications, etc.) and/or may manage access to the hardware (e.g., processors, memory, storage devices etc.) of the computing device.

In some embodiments, a container orchestration engine 214 (referred to herein as container host 214), such as the Redhat™ OpenShift™ module, may execute on the host OS of each of the service device 110 and the computing devices 130, as discussed in further detail herein. The container host 214 may be a platform for developing and running containerized applications and may allow applications and the data centers that support them to expand from just a few machines and applications to thousands of machines that serve millions of clients. The container host 214 may provide an image-based deployment module for creating containers and may store one or more image files for creating container instances. The container host 214 may include a storage driver (not shown), such as OverlayFS, to manage the contents of an image file including the read only and writable layers of the image file.

A typical deployment of the container host 214 may include a control plane 215 and a cluster of compute nodes 131, including compute nodes 131A and 131B (also referred to as compute machines). The compute nodes 131 may run the aspects of the container host 214 that are needed to launch and manage containers, pods, and other objects. For example, a compute node may be a physical server that provides the processing capabilities required for running containers in the environment. A compute node may also be implemented as a virtual server, logical container, or GPU, for example.

Figure 2:
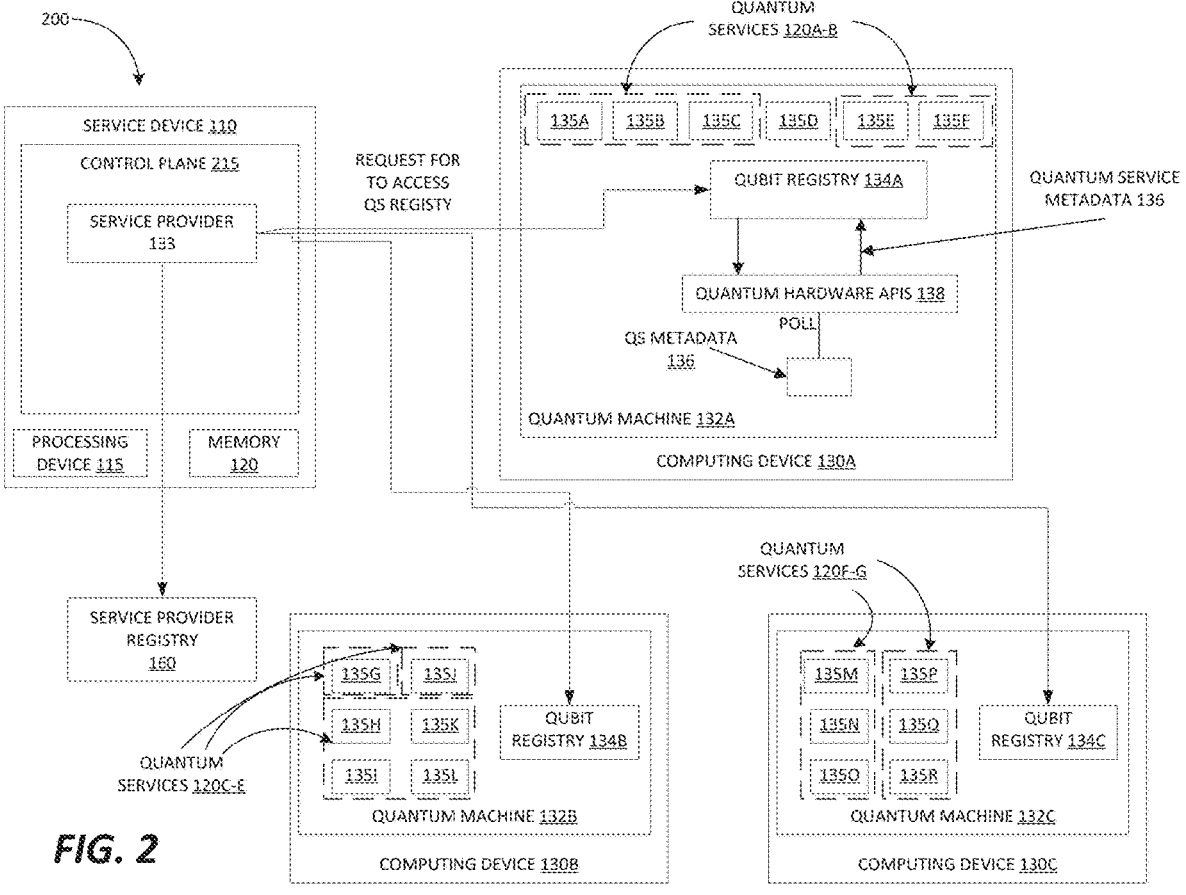
FIG. 2 is a block diagram that illustrates an example system, in accordance with some embodiments of the present disclosure.

Referring to FIG. 2, in some embodiments each of the computing devices 130 may comprise quantum machines 132A-C that operate in a quantum environment but can operate using classical computing principles or quantum computing principles. When using quantum computing principles, the quantum machines 132A-C perform computations that utilize quantum-mechanical phenomena, such as superposition and entanglement. The quantum machines 132A-C may operate under certain environmental conditions, such as at or near 0° Kelvin. When using classical computing principles, the quantum machines 132A-C utilizes binary digits that have a value of either 1 or 0.

Each quantum machine 132A-C may implement a set of qubits 135A-R and may include a respective qubit registry 134A-C. While solely for purposes of illustration each quantum machine 132 A-C is described as having only six qubits 135, it is apparent that each quantum machine 132 A-C may have hundreds or thousands of qubits 135 in some implementations. Each qubit registry 134 A-C may be a program executing within the respective quantum machine 132 A-C that services (e.g., services that clients wish to deploy) may interface with in order to request access to qubits 135 for execution. A qubit registry 134 A-C may maintain information on the total number of qubits 135 implemented by the respective quantum machine 132 A-C and the total number of qubits 135 that are currently available for allocation. A qubit registry 134 A-C may also maintain a task manager (also referred to as a services log—not shown) that indicates which qubits 135 are currently allocated and the services they are currently allocated to. The task manager may also include for each of the qubits 135 of its respective quantum machine 132 A-C, address information that indicates how to refer to the qubit 135 from an addressing perspective.

As discussed hereinabove, qubits are fragile/finite resources. In a shared environment where multiple services must share the same finite pool of qubits, effective management and gating of qubit allocation is important to maintain a system that can run quantum services efficiently. Embodiments of the present disclosure may utilize a qubit registry that is enhanced to gate the allocation of qubits using a contract (e.g., a smart contract) that is based on the current capabilities of a respective quantum machine.

Referring to FIG. 2, a system 200 is illustrated that includes a service device 110 coupled to computing devices 130A-C and a service provider registry 160. While in one embodiment, there are three computing device 130A-C, in other embodiments, there can be more or less computing devices coupled to the service device 110. In one embodiment, the service device 110 can include a control plane 215 that is executing a service provider 133 process. In this embodiment, the service provider 133 requests access to registries for each of the computing devices 130A-C. The service device 110 further includes a processing device 115 and memory as described above.

In one embodiment, each of the computing devices 130A-C includes a quantum machine 132A-C as described above in FIG. 1. Each of these quantum machines can include one or more qubits. For example, and in one embodiment, as illustrated in FIG. 2, each of the quantum machines 132A-C include six qubits 135A-R. while in one embodiment, each of the quantum machines 132A-C has the same number of qubits, in alternate embodiments, the quantum machines 132A-C can have the same or different number of qubits. In addition, the quantum machines 132A-C can be different types of quantum machines and the qubits can be the same or different types of qubits. Each of quantum machines 132A-C can further include a qubit registry 134A-C that is used to store the quantum machine 132A-C quantum service metadata. In one embodiment, this quantum service metadata is data that characterizes. Each of the qubit registries 134A-C may obtain quantum service metadata 136 that indicates the current capabilities of the quantum machine 132A. The qubit registry 134A may use quantum hardware APIs 138 to poll various components of the quantum machine 134A such as e.g., task managers, heat sensors, and memory (e.g., to determine types of error correction software supported by the quantum machine 132A), among other components to obtain the quantum service metadata 136. The quantum service metadata 136 may include a number of qubits 135A-F available to allocate, a coherence level of the quantum machine 132A, a current temperature of the quantum machine 132A, T1 times, T2 times, quantum communication pathways provided by the quantum machine 132A, quantum phenomena provided by the quantum machine 132A, and types of error correction software supported by the quantum machine 132A. The quantum service metadata 136 may further include a real-time state of each qubit 135 that indicates whether the qubit 135 is in an entangled state, is in superposition, etc. The qubit registry 134A may obtain quantum service metadata 136 as discussed hereinabove at any appropriate interval to ensure that it maintains a real-time picture of the quantum machine 132A's capabilities. Furthermore, the quantum service metadata 136 can include data that characterizes the use and state of a quantum system. For example, and in one embodiment, the data that characterizes a quantum system can be one or more of how the quantum service can be connected, a protocol a quantum service uses to connect, authentication mechanism, qubits the quantum service has access to, whether the quantum service has programmatic markers for entanglement, capacity, qubit temperature, noise, error count, geolocation for qubits, and quantum channel routing.

In addition, the quantum service metadata 136 can be data that characterizes the quantum system configured on each of the quantum machines 132A-C. In one embodiment, each of the quantum system can be a system that is configured to use one or more of the qubits that are part of the corresponding quantum machine 132A-C. For example, and in one embodiment, the quantum machine includes quantum system 120A that includes three qubits 135A-C and quantum system 120B that includes three qubits 135E-F. In this example, the qubits 135D is not part of a quantum system. Furthermore, quantum machine 132B includes three quantum systems: quantum system 120C (qubit 135G), quantum system 120D (qubit 135J), and quantum system 120E (qubits 135H-L). In addition, quantum machine 132C includes two quantum systems: quantum system 120F (qubits 135M-O) and quantum system 120G (qubits 135P-Q). The qubit registry 134A may include a contract generation module 137 which may analyze the quantum service metadata 136 and generate a contract 138 based thereon. The contract 138 may include service criteria comprising a set of limitations (not shown) on services requesting qubits 135, the set of limitations being based on the current capabilities of the quantum machine 132A (as indicated by the quantum service metadata 136). The service criteria may include limitations on e.g., the number of qubits 135 a service can request, the types of error correction software that can be used by a service, the quantum phenomena (e.g., quantum entanglement, quantum teleportation) that a service can utilize/ quantum state(s) that a service can put qubits 135 in, the noise impact of a service, and the heat impact of a service, among others. The qubit registry 134A may tailor each limitation of the service criteria so that services that meet the service criteria will not exceed the current capabilities of the quantum machine 134A while executing. It should be noted that different qubits 135 can be made of different materials e.g., silicon-based, photon-based etc. and in order for execution of some services to be optimized, those services must execute on qubits 135 made from certain materials. As a result, in some embodiments, the qubit registry 134 may generate limitations that restrict certain services (based on e.g., their classification) to only qubits 135 made from particular materials. For example, any service that needs to dynamically request more resources for additional storage or computational needs and thus requires more qubits may be subject to a limitation requiring the use of qubits of a certain type of material.

Each quantum service 120A-G may include a program descriptor that includes service information such as a number of qubits 135 required by the service, what types of error correction software the service uses, what quantum phenomena the service requires, and a classification of the service, the protocol use to access the service, among other information. With respect to the classification of the service, in some embodiments the classification may be part of the service information (e.g., a QASM file corresponding to the service may describe what the intentions of the service are). In other embodiments, the qubit registry 134A may predetermine a set of different classifications and classify the service upon receiving a request for qubits 135 from the service. The qubit registry 134A may also determine certain additional aspects of the service information based on the service information provided by the program descriptor. Examples of additional aspects of the service information may include e.g. a heat impact of the service and a noise impact of the service. In some embodiments, the heat and noise impact of the service may be determined by the qubit registry from the service information (e.g., the corresponding QASM file of the service may be annotated with heat and noise impact data based on historical executions of the service). In other embodiments, the heat and noise impact of the service can also be obtained from appropriate services (e.g., error correction or heat monitoring services) to create a metric that shows the impact that previous executions of the service had on the quantum machine 132A. While in one embodiment, each quantum service 120A-F uses qubits from the same quantum machine in alternate embodiments, a quantum service can include qubits from different quantum machines. In this embodiment, a quantum service can include qubits from multiple different machines. Furthermore, there can be restrictions on the types of qubits that can be used in a quantum service on multiple quantum machines (e.g., same material type of qubits, qubit physical location, polarization or current spin of a qubit, whether the qubits are shared with other services or not (e.g. Qubit 1 is used by Service 1 and 2 (not at the same time obviously) which means there can be a natural waiting time while the qubit is rotated). If a quantum service does span multiple quantum machines, in one embodiment, the corresponding registries for that quantum service can include quantum service metadata regarding the other quantum machine(s) (e.g., noise, heat, recent errors, load on system, T1 and T2 times, number of client requests, and other load based indicators that can derived (e.g. time between requests, service time, lead time, and other derivable characteristics)).

Figure 3:
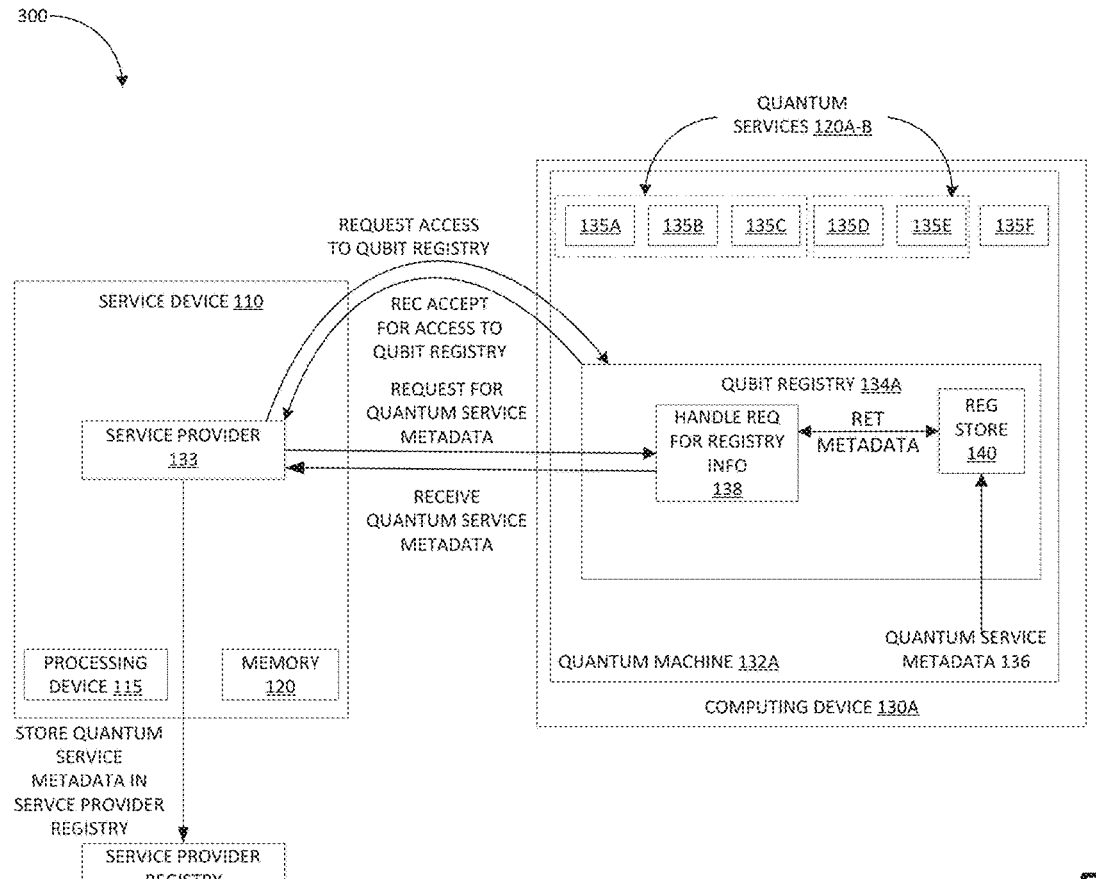
FIG. 3 is a block diagram that illustrates an example system, in accordance with some embodiments of the present disclosure.

As per above, the service provider device periodically requests the quantum service metadata from each of the registries and stores this quantum service metadata into a service registry. FIG. 3 illustrates the system 300 requesting quantum service metadata from a quantum machine 132A regarding the quantum services 120A-B configured on the quantum machine 132A, in accordance with some embodiments of the present disclosure. In one embodiment, the service provider 133 can request access to the qubit registry 134A by transmitting a request to access the qubit registry 134A. The qubit registry 134A can decide to grant access to the service provide 133. For example, and in one embodiment, the qubit registry 134A may use a rules-driven database to determine to allow access for the service provider 133. Once access is granted, the service provider 133 can request the quantum service metadata 136 from the qubit registry 134A. In one embodiment, the service provider 133 can request the quantum service metadata 136 individually (e.g., the service provider 133 making requests by name) or the quantum service metadata can be requested in bulk. In a further embodiment, the service provider 133 can use a pub/sub mechanism, where the service provider 133 can subscribe to some or all of the quantum service metadata 136 that is managed by the qubit registry 136. In a pub/sub model, the service provider receives 133 the quantum service metadata 136 as the quantum service metadata 136 changes or becomes available. In one embodiment, the qubit registry 134A includes a module 138 for handling the requests for registry information. In this embodiment, the module 138 receives requests from the service provider 133 and retrieves the information from a registry store 140 that stores the quantum service metadata 136. The module 138 sends the requested quantum service metadata to the service provider 133. The service provider 133 stores the received quantum service metadata in the service provider registry 160.

In one embodiment, the service provider registry 160 stores quantum service metadata about the quantum services known to the service provider 133. In one embodiment, the quantum service metadata can be stored in a variety of formats (key-value pair or another format that can be used to store metadata). With the quantum service metadata stored about the available quantum services (e.g., quantum services 120A-G as illustrated in FIG. 1), other devices, such as service consumers can discover these quantum services as the quantum service metadata stored in the service repository allows the service consumers to discover one or more of the different quantum services.

The qubit registry 134A can also implement a ledger of services that can be interrogated by a user to access information such as: which services have been deployed by which users, the number of qubits resources currently being consumed by each service, a noise impact of each service, error correction software being used by each service, heat impact of each service, and usage restrictions on each service, among others. One or more of the service consumers can gather the information from the stored quantum service metadata to request a quantum service or be used for other actions. For example, and in one embodiment, a service consumer can query about any of the quantum services in the service registry using pre-defined information about the quantum service.

Referring to FIG. 4, a system 400 is illustrated that includes a service device 110 coupled to the service registry. In one embodiment, the service device 110 is as described in FIG. 2 above. In addition, the service registry is coupled to service consumer devices 402A-N. In one embodiment, each of the service consumer devices 402A-N is a device that is capable of querying the service registry over a network (not illustrated). For example, and in one embodiment, each of the service consumer devices 402A-N can independently be a personal computer, laptop, server smartphone, tablet, and/ or any other type of device that can query the service registry. In one embodiment, each of the service consumer devices can query the service registry for information regarding quantum systems. In this embodiment, the service consumer devices FIG. 5 is a flow diagram of a method 500 for implementing a service provider device to collect quantum service metadata about multiple quantum systems on multiple quantum machines and storing this quantum service metadata in a service registry, in accordance with some embodiments of the present disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by e.g., service device 110 as illustrated in FIGS. 2 and 3.

In FIG. 5, method 500 begins at block 505, by transmitting, with the service provider device, a request to each of the plurality of quantum machines, wherein the plurality of registries store quantum service metadata associated with a plurality of quantum services. In one embodiment, method 500 transmits request one of a variety possible protocols (e.g., through an Application Programming Interface call, Quantum Channel, supersense stream, Hypertext Transfer Protocol (HTTP), File Transfer Protocol (FTP), or another type of protocol). Method 500 can further receive an acceptance for the access to each of the plurality of registries to access the quantum service metadata. In one embodiment, method 500 receives the acceptance using the protocol at block 510. With the acceptance, method 500 can access each of the registries to request the quantum service metadata.

At block 515, method 500 periodically requests the quantum service metadata from the plurality of registries. In one embodiment, method 500 can request the quantum service metadata from each registry individually (e.g., the service provider making requests by name) or the quantum service metadata can be requested in bulk. In a further embodiment, method 500 can use a pub/sub mechanism, where method 500 can subscribe to some or all of the quantum service metadata that is managed by the registry. In a pub/sub model, method 500 receives the quantum service metadata as the quantum service metadata changes or becomes available. Method 500 stores the received quantum service metadata in the service registry at block 520. In one embodiment, the quantum service metadata can be stored in a variety of formats (key-value pair, or another type of format). With the quantum service metadata stored about the available quantum services (e.g., quantum services 120A-G as illustrated in FIG. 1), other devices, such as service consumers can discover these quantum services as the quantum service metadata stored in the service repository allows the service consumers to discover one or more of the different quantum services.

Figure 6:
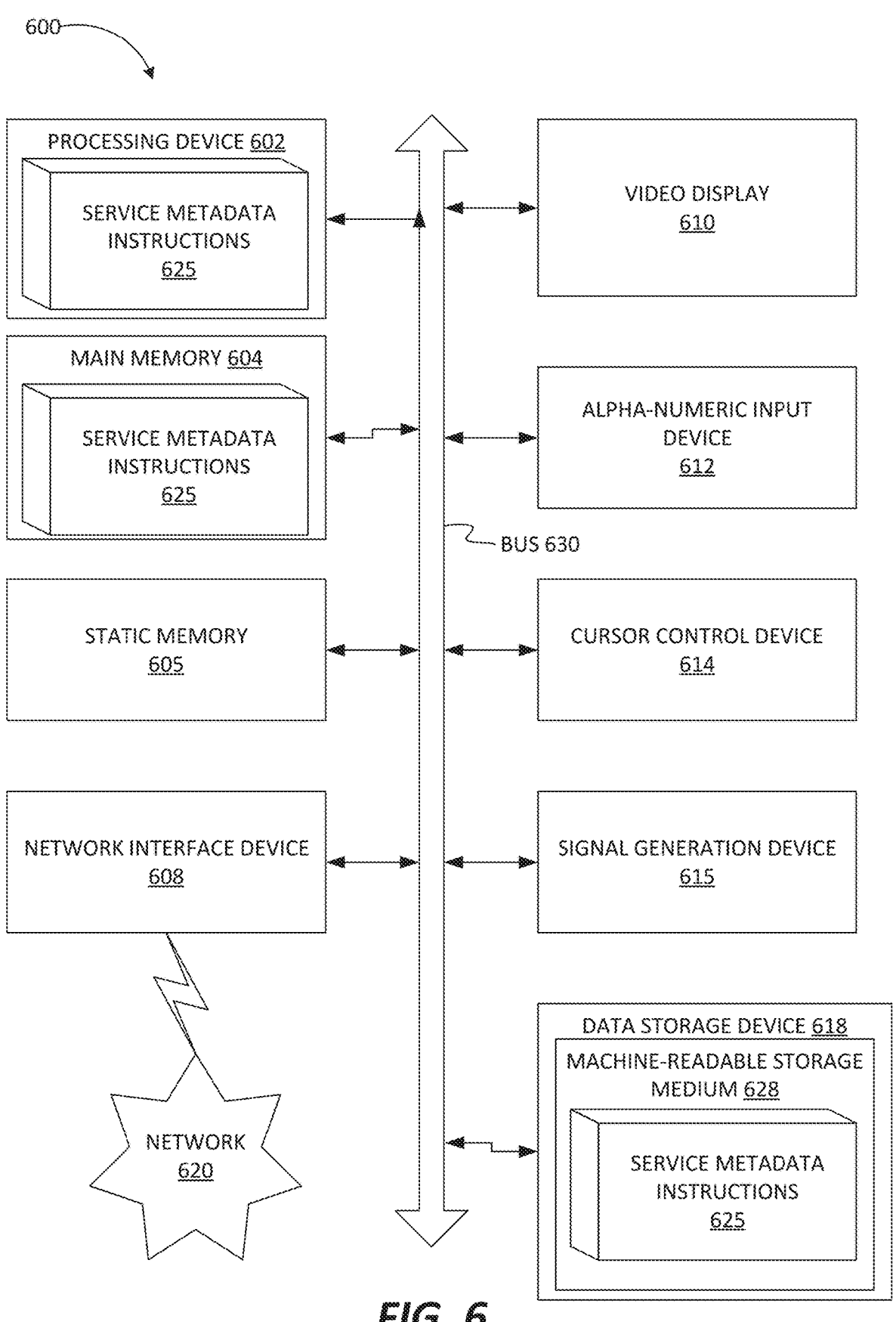
FIG. 6 is a block diagram of an example computing device that may perform one or more of the operations described herein, in accordance with some embodiments of the present disclosure.

FIG. 6 illustrates a diagrammatic representation of a machine in the example form of a computer system 600 within which a set of instructions, for causing the machine to perform any one or more of the methodologies discussed herein for implementing a qubit registry that is enhanced to gate the allocation of qubits using a contract e.g., a smart contract, in accordance with some embodiments of the present disclosure.

In alternative embodiments, the computer system 600 may be connected (e.g., networked) to other machines in a local area network (LAN), an intranet, an extranet, or the Internet. The computer system 600 may operate in the capacity of a server or a client machine in a client-server network environment, or as a peer machine in a peer-to-peer (or distributed) network environment. The computer system 600 may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single computer system is illustrated, the terms "computer system" and "machine" shall also be taken to include any collection of machines that individually or jointly execute a set (or multiple sets) of instructions to perform any one or more of the methodologies discussed herein. In one embodiment, computer system 600 may be representative of a server.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute service metadata instructions 625, for performing the operations and steps discussed herein.

The data storage device 618 may include a machine-readable storage medium 628, on which is stored one or more sets of service metadata instructions 625 (e.g., software) embodying any one or more of the methodologies of functions described herein. The qubit gating instructions 625 may also reside, completely or at least partially, within the main memory 604 or within the processing device 602 during execution thereof by the computer system 600; the main memory 604 and the processing device 602 also constituting machine-readable storage media. The service metadata instructions 625 may further be transmitted or received over a network 620 via the network interface device 608.

The machine-readable storage medium 628 may also be used to store instructions to implement a qubit registry that is enhanced to gate the allocation of qubits using a contract (e.g., a smart contract), as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method comprising:

transmitting, with a processing device of a service device, a request for access with a qubit registry to each of a plurality of quantum machines, wherein a plurality of qubit registries store quantum service metadata associated with a plurality of quantum services configured on the plurality of quantum machines, wherein at least one qubit registry of the plurality of qubit registries maintains information on a total number of qubits implemented by a respective quantum machine and wherein part of the quantum service metadata indicates capabilities of a corresponding quantum machine of the plurality of quantum machines and is obtained by a particular qubit registry of the plurality of qubit registries polling components of the corresponding quantum machine via quantum hardware application programming interfaces in the corresponding quantum machine;

receiving acceptance for access to each of the plurality of qubit registries;

periodically requesting, with the processing device of the service device, the quantum service metadata from the plurality of qubit registries; and storing the quantum service metadata, received from the plurality of qubit registries, in a service provider registry.

2. The method of claim 1, wherein the service provider registry is accessible to one or more service consumer devices.

3. The method of claim 1, wherein at least one of the plurality of quantum services includes a plurality of qubits.

4. The method of claim 1, wherein at least one of the plurality of quantum services includes a plurality of qubits over the plurality of quantum machines.

5. The method of claim 1, wherein the quantum service metadata includes characteristics regarding a use and state of the plurality of quantum services.

6. The method of claim 5, wherein the characteristics include one or more of how one of the plurality of quantum services is connected, a protocol of one of the plurality of quantum services uses to connect, an authentication mechanism, qubits accessible to one of the plurality of quantum services, whether any of the plurality of quantum services has programmatic markers for entanglement, capacity, noise, error count, geolocation for the qubits, and quantum channel routing.

7. The method of claim 1, wherein the acceptance for access to each of the plurality of qubit registries is governed using a rules-driven database.

8. A system comprising:

a memory; and a processing device, operatively coupled to the memory, the processing device to:

transmit a request for access with a qubit registry to each of a plurality of quantum machines, wherein a plurality of qubit registries store quantum service metadata associated with a plurality of quantum services configured on the plurality of quantum machines, wherein at least one qubit registry of the plurality of qubit registries maintains information on a total number of qubits implemented by a respective quantum machine and wherein part of the quantum service metadata indicates capabilities of a corresponding quantum machine of the plurality of quantum machines and is obtained by a particular qubit registry of the plurality of qubit registries polling components of the corresponding quantum machine via quantum hardware application programming interfaces in the corresponding quantum machine;

receive acceptance for access to each of the plurality of qubit registries;

periodically request the quantum service metadata from the plurality of qubit registries; and store the quantum service metadata, received from the plurality of qubit registries, in a service provider registry.

9. The system of claim 8, wherein the service provider registry is accessible to one or more service consumer devices.

10. The system of claim 8, wherein at least one of the plurality of quantum services includes a plurality of qubits.

11. The system of claim 8, wherein at least one of the plurality of quantum services includes a plurality of qubits over the plurality of quantum machines.

12. The system of claim 8, wherein the quantum service metadata includes characteristics regarding a use and state of the plurality of quantum services.

13. The system of claim 12, wherein the characteristics include one or more of how a quantum service is connected, a protocol the quantum service uses to connect, an authentication mechanism, qubits accessible to one of the plurality of quantum services, whether the quantum service has programmatic markers for entanglement, capacity, noise, error count, geolocation for the qubits, and quantum channel routing.

14. The system of claim 8, wherein the acceptance for access to each of the plurality of qubit registries is governed using a rules-driven database.

15. A non-transitory computer-readable medium having instructions stored thereon which, when executed by a processing device, cause the processing device to:

transmit, with a processing device of a service device, a request for access with a qubit registry to each of a plurality of quantum machines, wherein a plurality of qubit registries store quantum service metadata associated with a plurality of quantum services configured on the plurality of quantum machines, wherein at least one qubit registry of the plurality of qubit registries maintains information on a total number of qubits implemented by a respective quantum machine and wherein part of the quantum service metadata indicates capabilities of a corresponding quantum machine of the plurality of quantum machines and is obtained by a particular qubit registry of the plurality of qubit registries polling components of the corresponding quantum machine via quantum hardware application programming interfaces in the corresponding quantum machine;

receive acceptance for access to each of the plurality of qubit registries;

periodically request, with the processing device of the service device, the quantum service metadata from the plurality of qubit registries; and store the quantum service metadata, received from the plurality of qubit registries, in a service provider registry.

16. The non-transitory computer-readable medium of claim 15, wherein the service provider registry is accessible to one or more service consumer devices.

17. The non-transitory computer-readable medium of claim 15, wherein at least one of the plurality of quantum services includes a plurality of qubits.

18. The non-transitory computer-readable medium of claim 15, wherein at least one of the plurality of quantum services includes a plurality of qubits over the plurality of quantum machines.

19. The non-transitory computer-readable medium of claim 15, wherein the quantum service metadata includes characteristics regarding a use and state of the plurality of quantum services.

20. The non-transitory computer-readable medium of claim 19, wherein the characteristics include one or more of how a quantum service is connected, a protocol the quantum service uses to connect, an authentication mechanism, qubits accessible to one of the plurality of quantum services, whether the quantum service has programmatic markers for entanglement, capacity, noise, error count, geolocation for the qubits, and quantum channel routing.

\* \* \* \* \*